ing gas to a composting mass by thermally or analytically sensing aerobic activity within the mass.

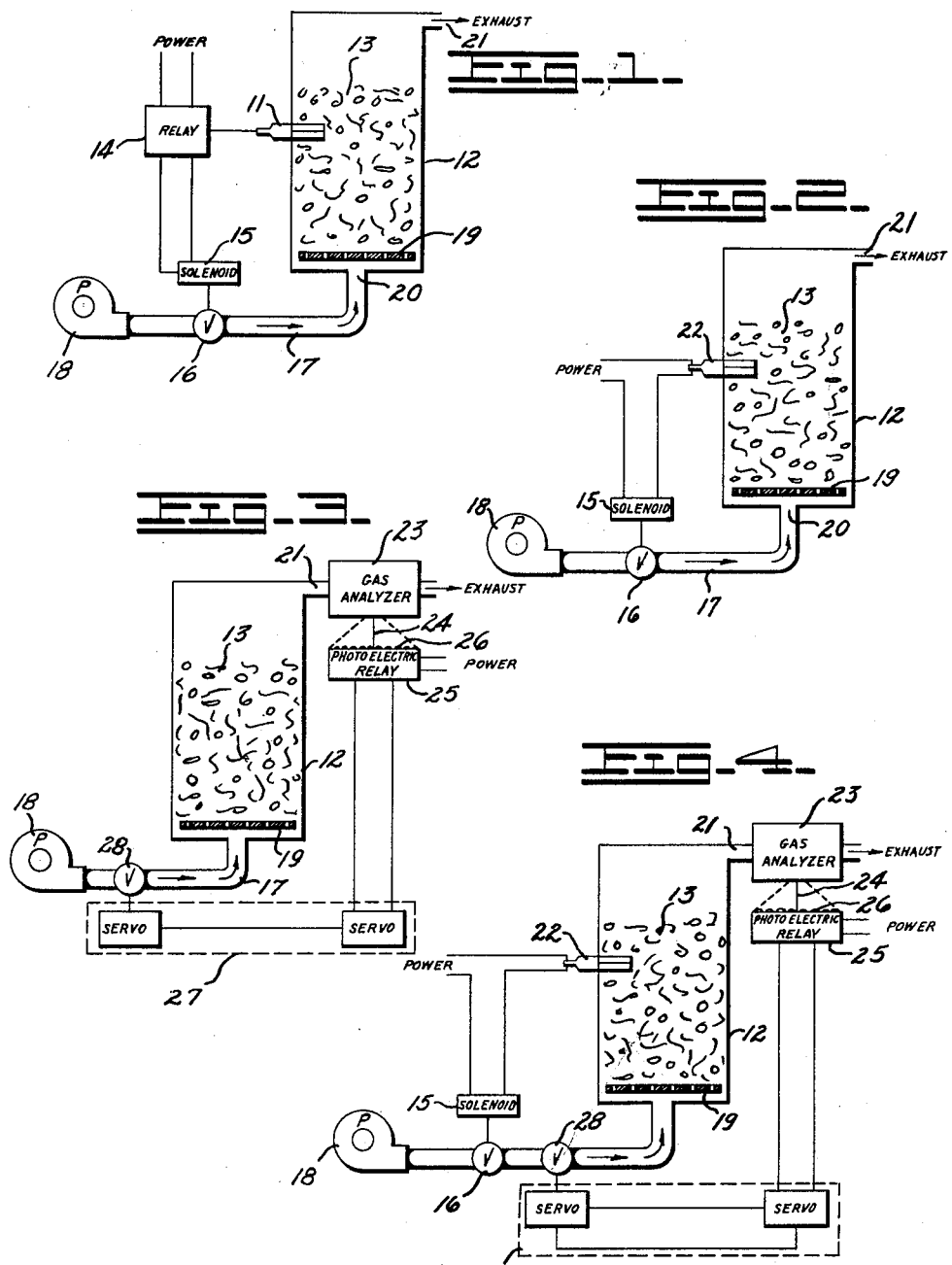

United States Patent Office 3,138,448
Patented June 23, 1964

3,138,448
METHOD FOR CONTROL OF AEROBIC DECOMPOSITION
Karl Ludwig Schulze, 148 Spartan Ave.,
East Lansing, Mich.
Continuation of application Ser. No. 699,703, Nov. 29, 1957, now Patent No. 3,010,801, dated Nov. 28, 1961. This application Mar. 28, 1961, Ser. No. 98,798
2 Claims. (Cl. 71—9)

This invention relates to a method for controlling the aerobic decomposition of organic material and more particularly to a method and apparatus for automatically regulating the aerobic decomposition or composting of organic material by varying air supply in response to sensed aerobic activity within the organic material undergoing decomposition.

Many types of methods have been utilized to treat organic waste material so as to obtain a valuable and utilizable end product. Various types of apparatus have been developed in attempts to provide an efficient and economic system which would provide a satisfactory end product with consistent regularity.

These methods are generally divided into aerobic and anaerobic classes. The anaerobic type of composting is associated with noxious odors and requires expensive digestion equipment by reason of its slow and incomplete breakdown of organic matter and control measures to avoid associated undesirable effects inherent in this system are complex in accord with the size of anaerobic plant.

The aerobic type of composting is highly desirable because it involves a faster process and results in a more complete breakdown of the complex organic material to be treated. There is no noxious odor or gas emitted from the aerobic process so long as anaerobic microorganisms are checked. Proper control over the growth cycle of aerobic microorganisms must be maintained at all times or the composting material will revert to an anaerobic state which is undesirable since the end product will be unsatisfactory. Composting plants using the aerobic process have hitherto attempted to control variables such as temperature, air supply, moisture, and agitation. This has been accomplished by observing changes, such as temperature and moisture content variations, in the composting material and then manually providing air, moisture, and/or agitation in amounts as appeared to be required in the opinion of the operator. No attempts have been made to provide an automatic system for the constant monitoring of a composting mass by sensing changes occurring in such a composting mass and by automatically controlling the air supply to the composting mass in response to these observed changes.

It is generally accepted that the heat in a mass of decomposing material is produced by the aerobic respiration of the microorganisms active in the material. Since respiration depends on the presence of oxygen, it has been found that by restricting the air supply to the decomposing material, it is possible to control the temperature. Overheating or improper cooling of the decomposing material can kill or retard the microorganisms, and, hence, have an undesirable effect on the entire process.

In addition to the control of air supply by the monitoring and sensing of temperature variations within the composting material, the instant invention utilizes an analysis of exhaust gases to achieve automatic quantitative control of the supply of air (oxygen containing gas) to the composting material. This adjustment of oxygen containing gas, such as air, is possible by determining the amount of particular gases in the exhaust which constitute an accurate criteria of decomposition progress.

Accordingly, it is an object of this invention to provide a method and automatic apparatus for enhancing aerobic activity within a composting mass by automatically controlling air supply in response to thermal variations in the composting mass.

Another object of this invention is to provide a method and automatic apparatus for enhancing aerobic activity within a composting mass by automatically controlling air supply in response to constant analysis of exhaust gases from the composting material.

Still another object of this invention is to provide a continuous automatic method and apparatus for the controlled supply of oxygen containing gas such as air to a composting mass, said apparatus responsive to changes in temperature and exhaust gas analysis of the composting mass.

Yet another object of this invention is to provide an apparatus for automatic supply of air to composting mass in selected amounts necssary to maintain optimum aerobic activity within a composting mass.

Other objects including ease of construction, economical maintenance, and automation of aerobic digestion processes will become apparent as the description proceeds.

The present application is a continuation of my previously filed application Serial Number 699,703, filed on November 29, 1957, now U.S. Letters Patent 3,010,801 and titled Apparatus for Control of Aerobic Decomposition.

In the drawings:
FIGURE 1 is a schematic view of a composting control apparatus utilizing a thermal sensing element through relay means to actuate a solenoid valve controlling the air supply.

FIGURE 2 is a schematic view of a composting control apparatus as shown in FIGURE 1, but utilizing an electric thermostat sensing thermal activity in a composting mass and transmitting the thermal conditions to a control valve operated as by a suitable solenoid.

FIGURE 3 is a schematic view of a composting control apparatus utilizing an exhaust gas analysis element to actuate an air supply valve through a photoelectrically controlled servo-mechanism.

FIGURE 4 is a schematic view of a composting control apparatus utilizing a thermal sensing element and exhaust gas analyzer to sense changes in aerobic activity within a composting mass and to controllably vary the air supply to said mass in response to those changes.

General Description

In general, a control apparatus is provided whereby a supply of oxygen containing gas such as air is automatically introduced in response to changes and variations in a composting mass. The changes made use of for establishing control are temperature in the mass and analysis of exhaust gases. Thermal control exercises a positive on-off function within a selected thermal operating range. Gas analysis exercises a throttling quantitative control over incoming oxygen containing gas to maintain a constant analytical result within a selected range and within the accuracy of known equipment.

It is well known in the art of aerobic decomposition of organic matter that heat is generated by aerobic activity. Where excessive heat was encountered a supply of air was manually increased to composting material to produce a cooling effect. This ignored the dehydrating effect of the surplus air and resulted in the disturbance of holding an optimum thermal range. There has been no known attempt to automatically regulate incoming oxygen containing gas on the basis of temperature variations and thereby holding an optimum temperature level in a composting mass. Hence, the present invention is addressed to making available automatic control of oxygen containing gas to a composting mass, in accord with optimum selected operating ranges.

It was found that if the air supply line to an enclosed mass of decomposing material is closed as by a thermostatically operated solenoid valve, at a pre-selected thermal level, the microorganisms use up the oxygen in the unit, aerobic respiration decreases, and heat diminishes. This diminution of heat can be utilized to cause the air supply line to open using thermal sensing means. The temperature sensing element opens the air supply valve until the pre-set temperature level is again reached and the cycle is repeated. This on-off cycle results in an automatic temperature control within a narrow range as long as the microorganisms are active enough to reach the pre-set temperature level. Thus, it is possible to operate automatically in a desired optimum temperature range. Simultaneously this type of temperature control automatically prevents excessive activity and heat production of the microorganisms, a factor which has been known to delay and impair the decomposition process. With a decrease in the activity of the decomposition process, the on-off cycle would stop and air would pass through the unit continuously because insufficient heat would be produced to achieve the pre-set temperature level.

The thermal control method and apparatus described above is a two-stage system, full-on and full-off. It has been found detrimental to deliver excessive air to the system because the air which is not utilized to the aerobic activity of the microorganisms tends to cool and dehydrate in some instances the entire composting mass thereby inhibiting the composting process. In addition, it is not economically advisable to deliver an oversupply of air. Therefore, an additional automatic control is provided whereby the amount of air supply delivered is the amount actually needed by the composting material. An exhaust gas analysis is continually conducted in order to determine the utilization and consumption of oxygen, for example, which is being utilized during the aerobic decomposition process. The exhaust gas analyzer controls an air supply throttling valve which restricts the amount or air being delivered to the amount needed to maintain the most efficient aerobic activity in the composting mass.

It is therefore seen that a method and apparatus is provided for automatically controlling air supply to a composting mass which not only incorporates safety-valve type of thermal responsive control, but incorporates exhaust gas analysis control thereby insuring that proper amounts of air are delivered to the composting mass resulting in a more efficient and economical aerobic decomposition. It will also be seen that optimum activity conditions can be sustained in a composting unit without manual intervention.

*Specific Description*

Referring more particularly to the drawings, as shown in FIGURE 1, a thermal sensing element 11 is extended into a composting unit or cell 12 so that it continuously senses the temperature in the composting material or mass 13 at all times. The thermal sensing element or thermostat 11 actuates a relay 14 which in turn actuates a solenoid 15 that turns valve 16 on or off. Valve 16 is mounted in the air supply line 17 and controls the air received from the air supply means 18 (as for example a pump or blower). It is within the scope of the invention to provide air under any desired pre-selected pressure. A diffuser plate 19 is provided near the air inlet 20 in the bottom of the unit 12 in order to insure that proper diffusion of intake air is obtained. It is within the scope of the invention to incorporate other known means of diffusing air within the composting mass such as jets, air delivery lines within the composting unit, or combined means for agitation of the composting mass during admission of an oxygen containing gas. An outlet 21 is provided so that exhaust gases formed during the aerobic decomposition of the organic matter may be dispersed.

As shown in FIGURE 2, an electrically operated thermostat 22 is incorporated into the apparatus thereby eliminating the need for a separate relay shown in FIGURE 1.

In the device as shown in FIGURE 3, an exhaust gas analyzer 23 is provided at the exhaust gas outlet 21. In the preferred embodiment the analyzer 23 is a Beckman Magnetic Oxygen Analyzer, a piece of apparatus well known in the art and produced by the Beckman Instrument Company. This type of analyzer operates on the principle that oxygen is unique among common gases in that it is highly paramagnetic, i.e. it tends to move into a magnetic field. Most common gases are slightly diamagnetic, i.e. repelled from a magnetic field.

A light beam 24 is emitted by the gas analyzer, the direction of the beam continuously indicating the concentration of oxygen in the exhaust gas which is desirably in excess of the oxygen required by the process. Inasmuch as the desired range of oxygen in the exhaust gases may be 2 to 5 percent (since air contains 21 percent oxygen, this means that 76 to 90 percent of the oxygen supplied is used in the process), a photoelectric relay 25 is provided having light sensitive elements 26 which are in register with the light beam 24. If the oxygen level of the exhaust gases falls to the 2 percent level, for example, the photoelectric relay 25 actuates a servo-mechanism 27 (which may comprise a master slave system) which actuates a throttle valve 28, adjusting the quantity of air delivered to the system. If the exhaust gas oxygen level rises above the 5 percent level, the throttle valve 28 decreases the amount of air being delivered to the system. At 2 percent or less, the throttle valve 28 is full open. While an oxygen analysis was employed as described, any of the other exiting gases in the exhaust which reflect aerobic activity and compost progress in relationship to oxygen consumption (for example $CO_2$ (carbon dioxide)), may similarly be used in well known continuous analytic procedures to provide oxygen admission control.

The apparatus as shown in FIGURE 4 combines the apparatus of FIGURE 2 with the apparatus of FIGURE 3 and provides a completely automatic control system responsive to thermal changes and content analysis of the exhaust gas.

With respect to the thermostatic control of air supply using the apparatus of FIGURE 2, tests were conducted in which the thermostat was pre-set at 45 degrees centigrade. Organic material (ground garbage) was placed in a composting unit 12 and the air-supply 18 was started. The temperature increased rather constantly for a twenty-four hour period until a final temperature of 45 degrees centigrade was reached. After the temperature rose to 45 degrees centigrade, the thermostat 11 closed the air valve 16 and the temperature inside the unit 12 decreased 2 degrees centigrade in a period of about 30 minutes. At this point the thermostat 11 re-opened the air valves 16. The temperature in the unit 12 started to increase and reached 45 degrees centigrade after a period of about 15 minutes had elapsed. At this point the air was again shut off. This on-off cycle continued automatically for approximately two days. During the following twenty-four hour period, the on-off periods decreased gradually and from the third day on, the on-off intervals occurred every two or three minutes for a period of about seven days. From the tenth day on, the period of air flow began to increase and by the end of the eleventh day, the on-off cycle ceased completely, the air valve stayed open continually, and the composting material cooled down to room temperature within two days.

As will be appreciated automatic control of oxygen supply to a composting mass can be accomplished using either thermal control or gas analysis control. Desirably they are combined.

The thermostatic control and the magnetic oxygen analyzer servo-unit control are combined to provide automatic control of the entire process.

In the starting process, as long as the material in the unit 12 has not reached the pre-set temperature level, the air supply line remains open. In order to adjust the quantity of air (oxygen containing gas) required, the above described servo-unit control is used to regulate the air supply until the pre-set temperature has been reached. At this point the thermostat will become active and regulate the air supply for the period during which the temperature mechanism is operative.

By combining the two methods of control proposed, the starting phase, the main phase, and the concluding phase of the decomposition process can be controlled automatically with regard to temperature and air supply.

The advantage lies in the fact that at all times oxygen is supplied according to demand, but no excessive amount. This saves power and prevents excessive cooling and loss of moisture. In addition, this method of automatic temperature control prevents overheating of the decomposing material and provides a means of running the decomposition process at a predetermined optimum level. This might be necessary in order to obtain specific results in the decomposition process. It has been found that various strains or cultures of microorganisms have varying optimum temperatures at which they perform at peak efficiency. Hence, the ability to conduct automatic controlled aerobic decomposition at a desired pre-selected temperature assumes great importance in isolating selected aerobic microorganic cultures.

Having thus described my invention it will be appreciated that some modifications within the skill of the art may be made, and such modifications are intended to be included herein limited only by the scope of the hereinafter appended claims.

I claim:
1. A method for controlling the aerobic decomposition of an organic mass by controlling the admission of an oxygen containing gas to said mass during the decomposition process consisting of the steps of:
   (a) injecting the oxygen containing gas into the decomposing mass at a point removed from a temperature sensing means and an exhaust gas analyzing means;
   (b) continuously analyzing, with a first condition responsive means, the exhaust gas from the decomposing mass and automatically correlating the results of said gas analysis with oxygen requirement limits within said decomposing mass;
   (c) continuously measuring, with a second condition responsive means, the temperature within the decomposing mass simultaneously with analyzing the exhaust gases, and automatically correlating said temperature measurement with oxygen requirement limits within said decomposing mass; and
   (d) automatically controlling the injection of the oxygen containing gas into the mass in response to the oxygen requirements indicated by one of said condition responsive means and quantitatively adjusted in response to the oxygen requirements indicated by the other condition responsive means.

2. A method of controlling the aerobic decomposition of an organic mass by controlling the admission of an oxygen containing gas to said mass during the decomposing process, consisting of the steps of:
   (a) injecting the oxygen containing gas into the decomposing mass at a point removed from a temperature sensing means and an exhaust analyzing means;
   (b) continuously analyzing the exhaust gases from, and simultaneously measuring the temperature within, the decomposing mass;
   (c) automatically correlating the results of said gas analysis and said temperature measurement with oxygen requirement limits within said decomposing mass;
   (d) automatically controlling an on-off valve means for allowing oxygen containing gas to be injected into the mass, in response to the oxygen requirements indicated by the temperature measurement; and
   (e) automatically controlling a throttling valve means, in series with the on-off valve means, for quantitatively adjusting the amount of oxygen to be injected into the mass in response to the continuous and simultaneous gas analysis of exiting gases from the mass.

References Cited in the file of this patent
UNITED STATES PATENTS

| | | |
|---|---|---|
| 1,597,724 | Cooke | Aug. 31, 1926 |
| 2,178,818 | Earp-Thomas | Nov. 7, 1939 |
| 2,474,833 | Eweson | July 5, 1949 |
| 2,679,114 | Morrison | May 25, 1954 |
| 2,734,803 | Ruskin | Feb. 14, 1956 |
| 2,878,112 | Morrison | Mar. 17, 1959 |
| 2,948,593 | Lawson | Aug. 9, 1960 |
| 2,954,285 | Carlson et al. | Sept. 27, 1960 |